(No Model.)
E. C. BRUEN.
STRAINER SUPPORT AND STRAINER.
No. 369,980. Patented Sept. 13, 1887.
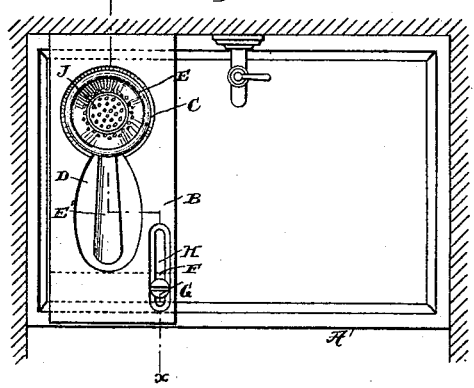
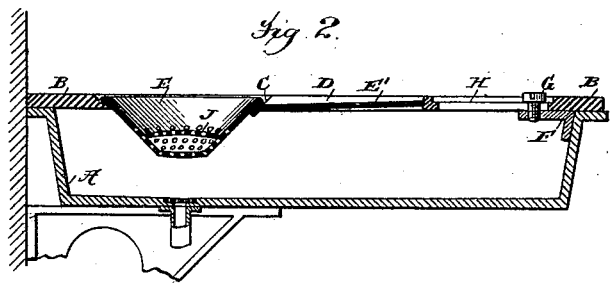
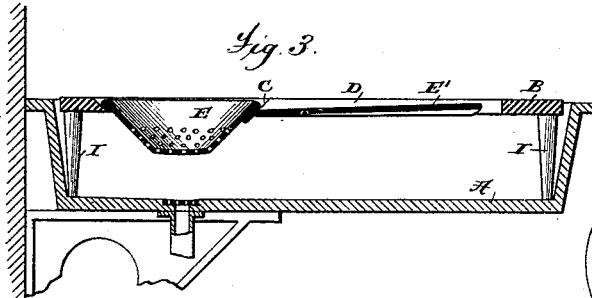
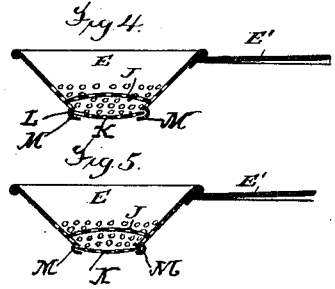
Attest:
Geo. H. Botts.
Fred K. Carnagan
Inventor
Edwin C. Bruen
By Ernest C. Webb
Atty.

UNITED STATES PATENT OFFICE.

EDWIN C. BRUEN, OF BROOKLYN, NEW YORK.

STRAINER-SUPPORT AND STRAINER.

SPECIFICATION forming part of Letters Patent No. 369,930, dated September 13, 1887.

Application filed December 1, 1886. Serial No. 220,341. (No model.)

*To all whom it may concern:*

Be it known that I, EDWIN C. BRUEN, a citizen of the United States, residing at Brooklyn, in the county of Kings and State of New York, have invented a certain new and useful Improvement in Strainer-Supports and Strainers, of which the following is a full, clear, and exact description.

My invention relates to a portable strainer-support and strainer for sinks and the like, the object being, first, to produce a strainer-support which can be adjusted so as to be removably applied to any sink of a size now in common use, and also adapted to support the strainer so the latter may be removed at any time without disturbing the supporting device, and, secondly, to produce a strainer provided with the ordinary perforated bottom and an auxiliary bottom, also perforated and arranged either above or below the ordinary bottom, whereby a double straining can be secured and a disinfecting medium can be conveniently employed when desired.

To this end my invention consists in the details of construction, as hereinafter described, and pointed out in the claims.

In the accompanying drawings, Figure 1 is a top plan view of the strainer-support and strainer applied to a sink. Fig. 2 is a cross-section of the same, taken on the line $xx$, Fig. 1. Fig. 3 is a cross-section of a strainer-support, strainer, and sink, illustrating a modification in the construction of the strainer-support. Figs. 4 and 5 are cross-sections illustrating my improvement in the strainer, and Fig. 6 is a bottom plan view of said strainer.

A designates the sink, and B the strainer-support.

As shown in Figs. 1 and 2, the strainer support consists of a board, or, preferably, flat piece of metal, having an annular opening, C, terminating in an elongated opening, D, to receive the body E and handle E' of the strainer. The body E of the strainer is conical and of less diameter than the opening C, except at its upper edge, which is of greater diameter, the rim of the strainer resting upon the strainer-support B. The elongated opening D is made large enough so that the handle E' of the strainer can be conveniently grasped when it is desired to remove the strainer from the support.

In order that the support may be readily connected to sinks of different dimensions, I prefer to employ a fastening device, which consists in a piece of angle-iron, F, having a threaded opening to receive a set-screw, G, the head of which rests in an elongated slot, H, formed near one end and extending in the direction of the length of the support. In attaching the support to a sink the angle-piece F is brought to bear against one of the walls of the sink and the set-screw tightened until the support is firmly secured in place. The support can be readily moved to any part of the sink or removed at pleasure.

In the modification shown in Fig. 3 I have shown the support B provided with legs I I. When of this construction, it is obvious that the support will have to be of such size that the legs will rest upon the bottom of the sink.

As shown in Fig. 2, the strainer is provided with an auxiliary bottom, J, soldered to the interior walls of the strainer above the ordinary bottom.

As shown in Figs. 4, 5, and 6, an auxiliary bottom, K, is removably secured to the strainer below the ordinary bottom, the two being reversely convexed, so as to form a receptacle, into which a disinfectant may be packed, if desired. This removable bottom K is provided with a slot, L, in one edge, and the rim of the ordinary bottom is provided with lips M M, projecting inwardly and opposite to each other. In connecting the bottom K, one edge is inserted under one of the lips M, and the other edge is, by means of the slot L, passed over the other lip M, and then by turning the bottom K until the slot is moved away from the lip the bottom will be locked in place. It may be found desirable in practice to form one of these bottoms with smaller perforations than the other. A strainer provided with a double bottom of the character described will insure more perfect straining, and when the auxiliary bottom is made so as to be removable a disinfecting medium can be readily employed. By this means the slops usually poured into sinks can be disinfected sufficiently to prevent the fouling of the sink and waste-pipe.

In the use of my strainer-support, when dishes and culinary utensils are being washed, the contents can be poured into the strainer from time to time, and the dregs, grounds, and particles of matter too large to pass through the perforations will be retained in the strainer, which can be lifted from the support whenever desirable and the accumulation of such matter deposited in the garbage-receptacle. By this means the sink can be kept clean and all liability of stoppage of the waste-pipe prevented.

What I claim as my invention, and desire to secure by Letters Patent, is—

1. A strainer-support for sinks, consisting of the combination, with a flat piece of suitable material having an opening shaped to receive and support a strainer, of adjusting means whereby the support may be removably secured to sinks of varying widths or sizes, substantially as described.

2. A strainer-support for sinks and the like, comprising a flat piece of suitable material having an opening shaped to receive and support a strainer and provided with the elongated slot H, set-screw G, and angle-piece F, whereby the support may be removably secured in place, substantially as described.

3. The combination of the strainer-support B, having the annular opening C and elongated opening D, with the strainer having the body E and handle E', substantially as described.

4. A strainer having an ordinary perforated bottom and a rim provided with inwardly-projecting lips M M, in combination with an auxiliary perforated bottom, K, provided with a slot, L, whereby the bottom K can be removably secured to the strainer below the ordinary bottom, as set forth.

In testimony whereof I have hereunto set my hand this 27th day of November, A. D. 1886.

EDWIN C. BRUEN.

Witnesses:
FRED P. CANAGAN,
W. S. HOLBROOK.